United States Patent Office 3,356,644
Patented Dec. 5, 1967

3,356,644
STABILIZED COMPOSITIONS
Yoon Chai Lee, Springfield, Mass., assignor to Monsanto Company, a corporation of Delaware
No Drawing. Filed Oct. 11, 1963, Ser. No. 315,667
14 Claims. (Cl. 260—45.95)

This invention relates to unsaturated nitrile polymers and more particularly relates to the stabilization of such polymers against discoloration.

The presence of a combined unsaturated nitrile, such as acrylonitrile, methacrylonitrile, etc., in a polymer is known to contribute valuable properties to the polymer. However, as is well known, the unsaturated nitrile present in the polymer has a tendency to discolor it, particularly when the polymer is subjected to the elevated temperatures required for molding and extrusion operations.

An object of the invention is to provide novel unsaturated nitrile polymer compositions having a reduced tendency toward discoloration.

Another object is to provide processes for stabilizing unsaturated nitrile polymers against discoloration.

These and other objects are attained by intimately mixing an unsaturated nitrile polymer (i.e., a polymer containing at least 10% by weight of a combined unsaturated nitrile of the group consisting of acrylonitrile, methacrylonitrile, ethacrylonitrile, propacrylonitrile, butacrylonitrile, and mixtures thereof) with about 0.05–1%, based on the weight of the polymer, of a polyoxypropylene polyol having a Staudinger average molecular weight of about 400–3000 and an average hydroxyl number of about 60–700.

The following examples are given to illustrate the invention. Unless otherwise specified, quantities mentioned are quantities by weight.

EXAMPLE I

Part A—Control

Dissolve about 0.03 part of di-t-butyl peroxide in a monomer mixture consisting of 70 parts of styrene and 30 parts of acrylonitrile. Purge the reaction vessel with nitrogen. Heat the reaction mixture at 125° C. for 3 hours and at 140° C. for 3.5 hours to form a styrene/acrylonitrile copolymer. Age the copolymer at 200° C. for 6 hours.

Part B

Prepare two aged styrene/acrylonitrile copolymers by repeating Part A except for also dissolving, respectively, (1) 0.02 part of a polyoxypropylene triol having an average molecular weight of 700 and an average hydroxyl number of 240 (POPT–700) and (2) 0.2 part of POPT–700 and 0.02 part of 2,6-di-t-butyl-p-cresol (DTBPC) in the monomer mixtures.

Part C

Determine the stabilizing effects of the additives of Part B by (1) dissolving 2 grams of each of the copolymers of Parts A and B in 50 ml. of chloroform, (2) measuring the percentage of light transmitted through each of the solutions at 380 mu, 400 mu, and 420 mu, (3) calculating the stabilizing effects of the additives in accordance with the equations:

$$\text{Stabilizing Effect (380 mu)} = \frac{100\ (Y-Z)}{Z}$$

$$\text{Stabilizing Effect (400 mu)} = \frac{100\ (W-X)}{X}$$

$$\text{Stabilizing Effect (420 mu)} = \frac{100\ (U-V)}{V}$$

wherein Z, X, and V represent the percentages of light transmitted through the solution of the copolymer of Part A at 380 mu, 400 mu, and 420 mu, respectively, and Y, W, and U represent the percentages of light transmitted through a solution of a copolymer of Part B at 380 mu, 400 mu, and 420 mu, respectively, and (4) calculating the average of the three stabilizing effects of each additive. The average stabilizing effects of the additives of Part B are shown below.

Additive: Stabilizing effect
0.2 POPT–700 _____ 287
0.2 POPT–700/0.02 DTBPC _____ 325

EXAMPLE II

Part A—Control

Charge 200 parts of water, 67 parts of styrene, 33 parts of acrylonitrile, about 0.03 part of di-t-butyl peroxide, and about 0.03 part of a water-soluble acrylic acid/2-ethylhexyl acrylate (93.2:6.8) copolymer to a suitable, agitated reaction vessel. Pressurize the reaction mixture with nitrogen and heat at 120–150° C. for about 8 hours to copolymerize the monomers. Filter, and then wash and dry the styrene/acrylonitrile copolymer beads.

Part B

Prepare a styrene/acrylonitrile copolymer by repeating Part A except for also including 0.1 part of a polyoxypropylene triol having an average molecular weight of 2500 and an average hydroxyl number of 67 (POPT–2500) and 0.05 part of 2,6-di-t-butyl-p-cresole (DTBPC) in the charge to the reaction vessel.

Part C

Mold two 0.15 inch-thick specimens of each of the copolymers of Parts A and B. Form Specimen I of each of the copolymers by extruding the copolymer beads at about 205° C. and injection molding the extruded pellets at about 200° C. Form Specimen II of each of the copolymers by extruding the copolymer beads at about 205° C., twice reextruding at 260° C., and injection molding the extruded pellets at about 200° C. Measure the reflectance of light of each of the specimens at 700 mu, 500 mu, and 420 mu, and calculate the three-point yellowness of the specimen in accordance with the equation:

$$3PY = 2\ R_{700} - (R_{500} + R_{420})$$

wherein 3PY represents the three-point yellowness value and $R_{700}$, $R_{500}$, and $R_{420}$ represent the reflectances at 700 mu, 500 mu, and 420 mu, respectively.

Part D

Calculated the color stabilizing effects of the additive of Part B in accordance with the equations:

$$\text{Stabilizing Effect I} = \frac{100\ (Y-Z)}{Y}$$

$$\text{Stabilizing Effect II} = \frac{100\ (W-X)}{W}$$

wherein Y and W represent the respect three-point yellowness values of Specimens I and II of the copolymer of Part A, and Z and X represent the respective three-point yellowness values of Specimens I and II of the copolymer of Part B. Stabilizing Effect I of the 0.1 POPT–2500/0.05 DTBPC additive is 30; Stabilizing Effect II is 23.

Part E

Calculate the difference between the three-point yellowness values of Specimens I and II of each of the copolymers of Parts A and B. Then determine the heat stabilizing effect of the 0.1 POPT-2500/0.05 DTBPC additive of Part B in accordance with the equation:

$$\text{Heat Stabilizing Effect} = \frac{100\,(Y-Z)}{Y}$$

wherein Y represents the difference between the three-point yellowness values of Specimens I and II of the copolymer of Part A, and Z represents the difference between the three-point yellowness values of Specimens I and II of the copolymer of Part B. The heat stabilizing effect of the additive is 15.

As demonstrated in the preceding examples, polyoxypropylene triols of the invention are effective in stabilizing unsaturated nitrile polymers against discoloration, and their effectiveness is enhanced by employing them in conjunction with an alkylphenol. Similar results are observed when:

(1) The stabilizer is intimately mixed with a preformed unsaturated nitrile polymer instead of being incorporated into the monomer charge employed in preparing the unsaturated nitrile polymer, (2) The polymer being stabilized is polyacrylonitrile, polymethacrylonitrile, a styrene/acrylonitrile (50:50) copolymer, a styrene/methacrylonitrile (85:15) copolymer, an alpha-methylstyrene/acrylonitrile (80:20) copolymer, a styrene/alpha-methylstyrene/acrylonitrile (50:40:10) terpolymer, or a styrene/acrylonitrile/N-t-butyl acrylamide (70:20:10) terpolymer, (3) The polyoxypropylene triol-700 or -2500 is replaced with 0.05–0.5 part of a polyoxypropylene diol having an average molecular weight of 400 and an average hydroxyl number of 265, a polyoxypropylene triol having an average molecular weight of 440 and an average hydroxyl number of 380, a polyoxypropylene pentol having an average molecular weight of 590 and an average hydroxyl number of 480, a polyoxypropylene pentol having an average molecular weight of 400 and an average hydroxyl number of 700, or a polyoxypropylene hexol having an average molecular weight of 700 and an average hydroxyl number of 490, or (4) The 2,6-di-t-butyl-p-cresol is replaced with 0.01–0.1 part of 2,2′-methylene-bis(6-t-butyl-p-cresol), 4,4′-butylidene-bis(6-t-butyl-m-cresol), 2-t-butyl-4phenylphenol, 2,6-dibenzyl-p-cresol, 2,6-diisopropylphenol, 2-t-butyl-p-cresol, or 2,6-di-t-butyl-hydroquinone.

The polymers which are stabilized in accordance with the present invention are unsaturated nitrile polymers, i.e., polymers containing at least 10% by weight of a combined unsaturated nitrile of the group consisting of acrylonitrile, methacrylonitrile, ethacrylonitrile, propacrylonitrile, butacrylonitrile, and mixtures thereof. Exemplary of such polymers are the homopolymers of these unsaturated nitriles, i.e., polyacrylonitrile, polymethacrylonitrile, etc.; interpolymers of two or more of these unsaturated nitriles, e.g., acrylonitrile/methacrylonitrile copolymers, acrylonitrile/methacrylonitrile/ethacrylonitrile terpolymers, etc.; interpolymers of at least 10% by weight of one or more of these unsaturated nitriles with up to 90% by weight of one or more copolymerizable monomers such as a monovinylidene aromatic hydrocarbon (e.g., styrene; an ar-alkylstyrene such as the o-, m-, and p-methylstyrenes, 2,4-dimethylstyrene, ar-ethylstyrenes, p-t-butylstyrene, etc.; an alpha-alkylstyrene such as alpha-methylstyrene, alpha-ethylstyrene, alpha-methyl-p-methylstyrene, etc.; vinyl naphthalene; and mixtures thereof), an alkyl (alk) acrylate, (e.g., methyl acrylate, ethyl acrylate, propyl acrylate, butyl acrylate, 2-ethylhexyl acrylate, the corresponding alkyl methacrylates, etc., and mixtures thereof), an acrylamide (e.g., acrylamide, methacrylamide; an N-alkyl acrylamide such as N-methyl acrylamide, N-butyl acrylamide, etc.; and mixtures thereof), dialkyl maleates and fumarates (e.g., diethyl maleate, dibutyl fumarate, etc., and mixtures thereof), etc. Many other unsaturated nitrile polymers which contain at least 10% by weight of a combined unsaturated nitrile and which present a discoloration problem because of their unsaturated nitrile content will be obvious to those skilled in the art.

A preferred embodiment of the invention is its application to the stabilization of acrylonitrile polymers, particularly monovinylidene aromatic hydrocarbon-acrylonitrile interpolymers containing about 15–50% by weight of combined acrylonitrile. Such interpolymers include those which contain no combined monomers other than acrylonitrile and one or more monovinylidene aromatic hydrocarbons as well as those which also contain a minor amount, e.g., up to about 20% by weight, of one or more combined comonomers such as the alkyl (alk)acrylate, acrylamide, and dialkyl maleate and fumarate comonomers exemplified above.

The stabilizers of the invention are polyoxypropylene polyols having average molecular weights of about 400–3000 and average hydroxyl numbers of about 60–700. Such polyethers, as is well known, are ordinarily prepared by the polymerization of an alkylene oxide having a terminal epoxy group, e.g., ethylene oxide, propylene oxide, butylene oxide, etc., on an aliphatic or aromatic compound which preferably has at least two primary hydroxyl groups and may contain one or more secondary hydroxyl groups, e.g., ethylene glycol, propylene glycol, glycerol, diethylene glycol, sorbitol, sucrose, etc.

Exemplary of the stabilizers of the invention are a polyoxypropylene diol having an average molecular weight of 400 and an average hydroxyl number of 265, a polyoxypropylene triol having an average molecular weight of 440 and an average hydroxyl number of 380, a polyoxypropylene triol having an average molecular weight of 700 and an average hydroxyl number of 240, a polyoxypropylene triol having an average molecular weight of 2500 and an average hydroxyl number of 67, a polyoxypropylene pentol having an average molecular weight of 400 and an average hydroxyl number of 700, a polyoxypropylene pentol having an average molecular weight of 590 and an average hydroxyl number of 480, a polyoxypropylene hexol having an average molecular weight of 700 and an average hydroxyl number of 490, etc., and mixtures thereof. The polyoxypropylene triols, especially those having the lower average molecular weights and the higher average hydroxyl numbers, are particularly preferred.

The amount of stabilizer employed should be in the range of about 0.05–1%, preferably about 0.05–0.5%, based on the weight of the unsaturated nitrile polymer. When the stabilizer is incorporated into a monomer charge which is to be suspension-polymerized to form an unsaturated nitrile polymer, concentrations of stabilizer higher than 0.5% are frequently undesirable because of a deleterious effect on suspension stability.

The alkylphenols which can be used in conjunction with the stabilizers of the invention are aromatic compounds which have at least one hydroxyl group and at least one alkyl group attached to a benzene nucleus. When used, the alkylphenols are ordinarily employed in concentrations of about 0.01–0.1%, based on the weight of the unsaturated nitrile polymer. Up to about 5% of an alkylphenol may be employed when it is mixed with a preformed unsaturated nitrile polymer, but these higher concentrations of alkylphenol are usually undesirable when it is incorporated into a monomer charge which is to be polymerized to form an unsaturated nitrile polymer. Alkylphenols suitable for use in conjunction with the stabilizers of the invention include, e.g.:

2,2′-methylene-bis(6-t-butyl-p-cresol)
2,2′-methylene-bis(6-t-butyl-4-ethylphenol)
2,2′-methylene-bis(4-methyl-6-(1,1,3,3-tetramethylbutyl)phenol)
4,4′-thio-bis(6-t-butyl-m-cresol)
4,4′-butylidene-bis(6-t-butyl-m-cresol)
2,2′-methylene-bis(4,6-dimethylphenol)
2-t-butyl-4-(4-t-butylphenyl)phenol 2-t-butyl-4-phenylphenol
2,6-dibenzyl-p-cresol
2-benzyl-p-cresol
2-benzyl-6-t-butyl-p-cresol
2-benzyl-6-t-butyl-4-ethylphenol
2,4-dimethyl-6-(1-methyl-1-cyclohexyl)phenol
2,6-diisopropyl-p-cresol
2,4-dimethyl-6-isopropylphenol
2-t-butyl-4,6-dimethylphenol
2-t-butyl-p-cresol
2-(1,1,3,3-tetramethylbutyl)-p-cresol
2,4,6-trimethylphenol
2,6-di-t-butyl-p-cresol
2,6-di-t-butyl-4-ethylphenol
2,6-diisopropylphenol
2,6-di-t-butyl-4-phenylphenol
2,6-di-t-butyl-4-(4-t-butylphenyl)phenol
2,5-di-t-butylhydroquinone
2,5-di-t-amylhydroquinone, etc.

The stabilizers of the invention and the alkylphenols, when employed, can be incorporated into the unsaturated nitrile polymers by any technique which permits their uniform distribution throughout the polymers, e.g., by blending them with preformed unsaturated nitrile polymers on a two roll mill or other suitable mixing device, by adding them to the monomer charge which is to be polymerized to form an unsaturated nitrile polymer, etc. According to a preferred embodiment of the invention, the stabilizer and the alkylphenol, when employed, are added to a polymerizable material containing at least 10% by weight of an unsaturated nitrile, and the polymerizable material is then polymerized by any desired conventional technique, e.g., by heating the polymerizable material at a temperature in the range of about 50–200° C. using a mass, solution, emulsion, suspension, batch, or continuous polymerization technique.

When desired, the stabilized compositions of the invention can contain optional additives such as plasticizers, lubricants, colorants, rubbery polymers, etc., which are sometimes added to the polymeric compositions and, in other cases, e.g., when grafting onto a rubber backbone is desired, are incorporated into the polymerizable material comprising the unsaturated nitrile.

It is obvious that many vairations can be made in the products and processes set forth above without departing from the spirit and scope of this invention.

What is claimed is:

1. A composition which comprises an unsaturated nitrile polymer containing at least 10% by weight of a combined unsaturated nitrile of the group consisting of acrylonitrile, methacrylonitrile, ethacrylonitrile, propacrylonitrile, butacrylonitrile, and mixtures thereof, said nitrile polymer being selected from the class consisting of homopolymers of the nitriles of said group, interpolymers of the nitriles of said group with each other, and interpolymers of the nitriles of said group with a comonomer selected from the class consisting of monovinylidene aromatic hydrocarbons, alkyl acrylates, alkyl alkacrylates, acrylamides, N-alkyl acrylamides, dialkyl maleates, and dialkyl fumarates in intimate admixture with about 0.05–1%, based on the weight of the polymer, of the product of the polymerization of an alkylene oxide with a terminal epoxy group upon a polyol, said product having an average molecular weight of about 400–3000 and an average hydroxyl number of about 60–700.

2. The composition of claim 1 wherein the combined unsaturated nitrile is acrylonitrile.

3. The composition of claim 1 wherein the unsaturated nitrile polymer is a monovinylidene aromatic hydrocarbon/acrylonitrile interpolymer containing about 15–50% by weight of combined acrylonitrile.

4. The composition of claim 3 wherein the monovinylidene aromatic hydrocarbon/acrylonitrile interpolymer is a styrene/acrylonitrile copolymer.

5. The composition of claim 3 wherein the monovinylidene aromatic hydrocarbon/acrylonitrile interpolymer is an alpha-methylstyrene/acrylonitrile copolymer.

6. The composition of claim 3 wherein the monovinylidene aromatic hydrocarbon/acrylonitrile interpolymer is a styrene/alpha-methylstyrene/acrylonitrile terpolymer.

7. The composition of claim 1 wherein the polymerization product is a polyoxypropylene triol.

8. The composition of claim 1 wherein the concentration of the polymerization product is in the range of about 0.05–0.5%, based on the weight of the polymer.

9. A composition which comprises an unsaturated nitrile polymer containing at least 10% by weight of a combined unsaturated nitrile of the group consisting of acrylonitrile, methacrylonitrile, ethacrylonitrile, propacrylonitrile, butacrylonitrile, and mixtures thereof, said nitrile polymer being selected from the class consisting of homopolymers of the nitriles of said group, interpolymers of the nitriles of said group with each other, and interpolymers of the nitriles of said group with a comonomer selected from the class consisting of monovinylidene aromatic hydrocarbons, alkyl acrylates, alkyl alkacrylates, acrylamides, N-alkyl acrylamides, dialkyl maleates, and dialkyl fumarates in intimate admixture with about 0.01–0.1% by weight of an alkylphenol and about 0.05–1% by weight of the product of the polymerization of an alkylene oxide with a terminal epoxy group upon a polyol, said product having an average molecular weight of about 400–3000 and an average hydroxyl number of about 60–700.

10. The composition of claim 9 wherein the alkylphenol is 2,6-di-t-butyl-p-cresol.

11. A composition which comprises a monovinylidene aromatic hydrocarbon/acrylonitrile interpolymer containing about 15–50% by weight of combined acrylonitrile in intimate admixture with about 0.01–0.1% by weight of 2,6-di-t-butyl-p-cresol and about 0.05–0.5% by weight of a polyoxypropylene triol having an average molecular weight of about 400–3000 and an average hydroxyl number of about 60–700.

12. The composition of claim 11 wherein the monovinylidene aromatic hydrocarbon/acrylonitrile interpolymer is a styrene/acrylonitrile copolymer.

13. A process which comprises intimately mixing about 0.05–0.5 part by weight of the product of the polymerization of an alkylene oxide with a terminal epoxy group upon a polyol, said product having an average molecular weight of about 400–3000 and an average hydroxyl number of about 60–700 with 100 parts by weight of a polymerizable material comprising 10 to 100 percent by weight of an unsaturated nitrile of the group consisting of acrylonitrile, methacrylonitrile, ethacrylonitrile, propacrylonitrile, butacrylonitrile, and mixtures thereof with each other and with 0 to 90 percent by weight of a comonomer selected from the class consisting of monovinylidene aromatic hydrocarbons, alkyl acrylates, alkyl alkacrylates, acrylamides, N-alkyl acrylamides, dialkyl maleates, and dialkyl fumarates and heating to polymerize the polymerizable material.

14. The composition of claim 1 wherein said alkylene oxide is propylene oxide and said polyol is a triol and wherein said polymerization product has an average molecular weight of 700 and an average hydroxyl number of 240.

References Cited

UNITED STATES PATENTS

| | | | |
|---|---|---|---|
| 2,459,746 | 1/1949 | Radcliffe | 260—45.95 |
| 2,715,112 | 8/1955 | Stanton et al. | 260—45.95 |
| 2,984,648 | 5/1961 | Williams et al. | 260—45.95 |
| 3,189,569 | 6/1965 | Finestone et al. | 260—23 |

DONALD E. CZAJA, *Primary Examiner.*

LEON J. BERCOVITZ, *Examiner.*

H. E. TAYLOR, *Assistant Examiner.*